(12) United States Patent
Chien

(10) Patent No.: US 10,826,912 B2
(45) Date of Patent: Nov. 3, 2020

(54) TIMESTAMP-BASED AUTHENTICATION

(71) Applicant: Daniel Chien, Bellevue, WA (US)

(72) Inventor: Daniel Chien, Bellevue, WA (US)

(*) Notice: Subject to any disclaimer, the term of this patent is extended or adjusted under 35 U.S.C. 154(b) by 0 days.

(21) Appl. No.: 16/220,652

(22) Filed: Dec. 14, 2018

(65) Prior Publication Data

US 2020/0195658 A1 Jun. 18, 2020

(51) Int. Cl.
*H04L 29/06* (2006.01)
*G06F 21/45* (2013.01)

(52) U.S. Cl.
CPC ........... *H04L 63/108* (2013.01); *G06F 21/45* (2013.01); *H04L 63/083* (2013.01); *H04L 2463/121* (2013.01)

(58) Field of Classification Search
CPC .............. H04L 63/083; H04L 63/0846; H04L 63/0876; G06F 1/14
See application file for complete search history.

(56) References Cited

U.S. PATENT DOCUMENTS

| | | | |
|---|---|---|---|
| 6,016,553 A | 1/2000 | Schneider et al. | |
| 6,185,678 B1 | 2/2001 | Arbaugh et al. | |
| 6,502,135 B1 | 12/2002 | Munger et al. | |
| 6,654,796 B1 | 11/2003 | Slater et al. | |
| 6,687,226 B1 | 2/2004 | Galyas | |
| 6,888,834 B1 | 5/2005 | Wood et al. | |
| 7,111,163 B1 | 9/2006 | Haney | |
| 7,143,175 B2 | 11/2006 | Adams et al. | |
| 7,346,770 B2 | 3/2008 | Swander et al. | |
| 7,363,656 B2 | 4/2008 | Weber et al. | |
| 7,401,358 B1 | 7/2008 | Christie et al. | |
| 7,457,823 B2 | 11/2008 | Shraim et al. | |

(Continued)

FOREIGN PATENT DOCUMENTS

| | | |
|---|---|---|
| WO | 2005/020446 | 3/2005 |
| WO | 2016/176686 | 11/2016 |

(Continued)

OTHER PUBLICATIONS

International Search Report and Written Opinion of the International Searching Authority dated Aug. 29, 2019, in International Patent Application No. PCT/US19/23274, 7 pages.

(Continued)

*Primary Examiner* — Linglan E Edwards
(74) *Attorney, Agent, or Firm* — Benedict R. Dugan; Lowe Graham Jones PLLC

(57) ABSTRACT

Techniques for computer security, and more specifically timestamp-abased authentication, are described. Some implementations provide an authentication method that utilizes an authentication process that is shared as a secret between a first and second computing system. The process provides as output a number that is based on a timestamp. The first computing system executes the authentication process using a timestamp obtained from its clock. The resulting number is transmitted to the second computing system, possibly along with other authentication data, such as a username and/or password. In response, the second computing system executes the authentication process using a timestamp obtained from its clock. If the numbers generated by the first and second computing systems match, the first computing system is authenticated.

19 Claims, 5 Drawing Sheets

(56) References Cited

U.S. PATENT DOCUMENTS

| | | | |
|---|---|---|---|
| 7,461,404 B2 | 12/2008 | Dudfield et al. | |
| 7,490,237 B1* | 2/2009 | Morais | H04L 63/08 |
| | | | 713/166 |
| 7,536,723 B1 | 5/2009 | Bhagwat et al. | |
| 7,540,028 B2 | 5/2009 | Ahmed et al. | |
| 7,602,731 B2 | 10/2009 | Jain | |
| 7,626,940 B2 | 12/2009 | Jain | |
| 7,725,936 B2 | 5/2010 | Banerjee et al. | |
| 7,797,436 B2 | 9/2010 | Banerjee et al. | |
| 7,826,602 B1 | 11/2010 | Hunyady et al. | |
| 7,832,009 B2 | 11/2010 | Wang et al. | |
| 7,979,889 B2 | 7/2011 | Gladstone et al. | |
| 8,161,552 B1 | 4/2012 | Sun et al. | |
| 8,423,631 B1 | 4/2013 | Mower et al. | |
| 8,495,700 B2 | 7/2013 | Shahbazi | |
| 8,788,839 B1 | 7/2014 | Dong et al. | |
| 8,813,186 B2 | 8/2014 | Hegg et al. | |
| 8,848,608 B1 | 9/2014 | Addepalli et al. | |
| 8,950,007 B1 | 2/2015 | Teal et al. | |
| 9,015,090 B2 | 4/2015 | Chien | |
| 9,172,721 B2 | 10/2015 | Jain | |
| 9,413,783 B1 | 8/2016 | Keogh | |
| 9,654,458 B1 | 5/2017 | Bhaktwatsalam et al. | |
| 9,825,911 B1 | 11/2017 | Brandwine | |
| 9,838,425 B2 | 12/2017 | Jalan et al. | |
| 9,892,284 B2 | 2/2018 | Wachendorf et al. | |
| 10,084,791 B2 | 9/2018 | Chien | |
| 10,171,463 B1 | 1/2019 | Wiger | |
| 2002/0049883 A1 | 4/2002 | Schneider et al. | |
| 2002/0133721 A1 | 9/2002 | Adjaoute | |
| 2002/0188704 A1 | 12/2002 | Gold et al. | |
| 2003/0084349 A1 | 5/2003 | Friedrichs et al. | |
| 2003/0101357 A1 | 5/2003 | Ronen et al. | |
| 2003/0118038 A1 | 6/2003 | Jalava et al. | |
| 2003/0149668 A1 | 8/2003 | Lee et al. | |
| 2003/0149887 A1 | 8/2003 | Yadav | |
| 2003/0149888 A1 | 8/2003 | Yadav | |
| 2003/0185395 A1 | 10/2003 | Lee et al. | |
| 2003/0188190 A1 | 10/2003 | Aaron et al. | |
| 2003/0217289 A1 | 11/2003 | Ammon et al. | |
| 2004/0003285 A1 | 1/2004 | Whelan et al. | |
| 2004/0068562 A1 | 4/2004 | Tilton et al. | |
| 2004/0088537 A1 | 5/2004 | Swander et al. | |
| 2004/0123141 A1 | 6/2004 | Yadav | |
| 2004/0123157 A1 | 6/2004 | Alagna et al. | |
| 2004/0162992 A1 | 8/2004 | Sami et al. | |
| 2004/0186850 A1 | 9/2004 | Chowdhury et al. | |
| 2004/0187034 A1 | 9/2004 | Tamura et al. | |
| 2004/0255151 A1 | 12/2004 | Mei et al. | |
| 2005/0047355 A1 | 3/2005 | Wood et al. | |
| 2005/0060412 A1 | 3/2005 | Chebolu et al. | |
| 2005/0076222 A1 | 4/2005 | Olkin et al. | |
| 2005/0144279 A1 | 6/2005 | Wexelblat | |
| 2005/0172229 A1 | 8/2005 | Reno et al. | |
| 2005/0228899 A1 | 10/2005 | Wendkos et al. | |
| 2006/0021031 A1 | 1/2006 | Leahy et al. | |
| 2006/0031412 A1 | 2/2006 | Adams et al. | |
| 2006/0059092 A1 | 3/2006 | Burshan et al. | |
| 2006/0059136 A1 | 3/2006 | Wooldridge et al. | |
| 2006/0059238 A1 | 3/2006 | Slater et al. | |
| 2006/0059337 A1 | 3/2006 | Poyhonen et al. | |
| 2006/0069697 A1 | 3/2006 | Shraim et al. | |
| 2006/0069782 A1 | 3/2006 | Manning et al. | |
| 2006/0123464 A1 | 6/2006 | Goodman et al. | |
| 2006/0123478 A1 | 6/2006 | Rehfuss et al. | |
| 2006/0146816 A1 | 7/2006 | Jain | |
| 2006/0168022 A1 | 7/2006 | Levin et al. | |
| 2006/0190993 A1 | 8/2006 | Noble | |
| 2006/0203807 A1 | 9/2006 | Kouretas et al. | |
| 2006/0212931 A1 | 9/2006 | Shull et al. | |
| 2006/0224742 A1 | 10/2006 | Shahbazi | |
| 2006/0230039 A1 | 10/2006 | Shull et al. | |
| 2006/0230272 A1 | 10/2006 | Lawrence et al. | |
| 2006/0230452 A1 | 10/2006 | Field | |
| 2006/0253903 A1 | 11/2006 | Krumel | |
| 2007/0006305 A1 | 1/2007 | Florencio et al. | |
| 2007/0022479 A1 | 1/2007 | Sikdar et al. | |
| 2007/0050377 A1 | 3/2007 | Srivastava et al. | |
| 2007/0083670 A1 | 4/2007 | Kelley et al. | |
| 2007/0268837 A1 | 11/2007 | Melton et al. | |
| 2008/0071953 A1 | 3/2008 | Kershaw et al. | |
| 2008/0077995 A1 | 3/2008 | Curnyn | |
| 2008/0104186 A1 | 5/2008 | Wieneke et al. | |
| 2008/0147837 A1 | 6/2008 | Klein et al. | |
| 2008/0172382 A1 | 7/2008 | Prettejohn | |
| 2008/0271118 A1 | 10/2008 | Greenlaw | |
| 2009/0043765 A1 | 2/2009 | Pugh | |
| 2009/0077616 A1 | 3/2009 | Lindholm et al. | |
| 2009/0185523 A1 | 7/2009 | Allen et al. | |
| 2009/0271625 A1 | 10/2009 | Kolluru et al. | |
| 2009/0287844 A1 | 11/2009 | Bailey | |
| 2009/0300759 A1 | 12/2009 | Wang et al. | |
| 2009/0311963 A1 | 12/2009 | Haverty | |
| 2010/0050255 A1 | 2/2010 | Upadhyay et al. | |
| 2010/0131756 A1 | 5/2010 | Schneider | |
| 2010/0132018 A1 | 5/2010 | Takala et al. | |
| 2010/0241836 A1 | 9/2010 | Proudler | |
| 2010/0325424 A1 | 12/2010 | Etchegoyen | |
| 2011/0113249 A1 | 5/2011 | Gelbard et al. | |
| 2012/0077480 A1 | 3/2012 | DeLuca | |
| 2012/0084549 A1 | 4/2012 | Mackintosh et al. | |
| 2012/0158541 A1 | 6/2012 | Ganti et al. | |
| 2013/0013905 A1 | 1/2013 | Held et al. | |
| 2013/0198065 A1 | 8/2013 | McPherson et al. | |
| 2013/0252604 A1 | 9/2013 | Huber et al. | |
| 2013/0301833 A1* | 11/2013 | Wong | H04W 12/06 |
| | | | 380/255 |
| 2013/0318573 A1 | 11/2013 | Reunamaki et al. | |
| 2013/0346628 A1 | 12/2013 | Canion et al. | |
| 2014/0006579 A1 | 1/2014 | Pitsch et al. | |
| 2014/0189808 A1* | 7/2014 | Mahaffey | H04L 63/0853 |
| | | | 726/4 |
| 2014/0244991 A1 | 8/2014 | Akdemir et al. | |
| 2014/0258465 A1 | 9/2014 | Li | |
| 2014/0313975 A1 | 10/2014 | Berenberg et al. | |
| 2014/0325588 A1 | 10/2014 | Jalan et al. | |
| 2015/0020214 A1 | 1/2015 | Copsey | |
| 2015/0026784 A1* | 1/2015 | Kurkure | H04L 63/083 |
| | | | 726/7 |
| 2015/0082438 A1 | 3/2015 | Prieto Alvarez et al. | |
| 2015/0089621 A1 | 3/2015 | Khalid et al. | |
| 2015/0089625 A1 | 3/2015 | Swanson et al. | |
| 2015/0188714 A1 | 7/2015 | Leoutsarakos et al. | |
| 2015/0213131 A1 | 7/2015 | Styler et al. | |
| 2015/0229609 A1 | 8/2015 | Chien | |
| 2015/0256546 A1 | 9/2015 | Zhu et al. | |
| 2015/0372978 A1 | 12/2015 | Bharrat et al. | |
| 2016/0021610 A1 | 1/2016 | Wan et al. | |
| 2016/0142393 A1 | 5/2016 | Wang et al. | |
| 2016/0261601 A1 | 9/2016 | Zhou et al. | |
| 2017/0011219 A1 | 1/2017 | Li et al. | |
| 2017/0034193 A1 | 2/2017 | Schulman et al. | |
| 2017/0118210 A1 | 4/2017 | Athias | |
| 2017/0185790 A1 | 6/2017 | Gauda | |
| 2017/0332307 A1 | 11/2017 | Pan | |
| 2017/0334522 A1* | 11/2017 | Zahid | H04W 12/0802 |
| 2017/0364685 A1 | 12/2017 | Shah et al. | |
| 2018/0020002 A1 | 1/2018 | Duca et al. | |
| 2018/0097843 A1 | 4/2018 | Bursell et al. | |
| 2018/0131719 A1 | 5/2018 | Amit et al. | |
| 2018/0189478 A1 | 7/2018 | Richardson et al. | |
| 2019/0190723 A1 | 6/2019 | Lee et al. | |

FOREIGN PATENT DOCUMENTS

| | | |
|---|---|---|
| WO | 2017/035159 | 3/2017 |
| WO | 2017/112641 | 6/2017 |
| WO | 2018/063583 | 4/2018 |

OTHER PUBLICATIONS

Extended European Search Report completed Jul. 11, 2016, in European Patent Application No. 14 83 6161, 7 pages.

(56) References Cited

OTHER PUBLICATIONS

Horowitz, Michael, "Examples of Links That Lie," michaelhorowitz. com, last updated Jan. 29, 2008, retrieved from the Internet at http://www.michaelhorowitz.com/linksthatlie.html, on Feb. 8, 2008, 11 pages.
International Search Report and Written Opinion of the International Searching Authority dated Oct. 18, 2018, in International Patent Application No. PCT/US18/29486, 8 pages.
International Search Report and Written Opinion of the International Searching Authority dated Aug. 21, 2014, in International Patent Application No. PCT/US14/31244, 6 pages.
International Search Report and Written Opinion of the International Searching Authority dated Jul. 25, 2019, in International Patent Application No. PCT/US19/34039, 7 pages.
International Search Report and Written Opinion of the International Searching Authority dated Oct. 12, 2007, in International Patent Application No. PCT/US06/35159, 6 pages.
International Search Report and Written Opinion of the International Searching Authority dated Jan. 31, 2018, in International Patent Application No. PCT/US17/60889, 6 pages.
International Search Report and Written Opinion of the International Searching Authority dated Feb. 21, 2018, in International Patent Application No. PCT/US17/61886, 6 pages.
International Search Report and Written Opinion of the International Searching Authority dated Apr. 23, 2008, in International Patent Application No. PCT/US07/64102, 8 pages.
"Netcraft Toolbar Tutorial," Netcraft Ltd, 2007, retrieved from the Internet at http://news.netcraft.com/archives/2004/12/29/netcraft_toolbar_tutorial.html, on Feb. 8, 2008, 4 pages.
Office Action dated Mar. 20, 2009, in U.S. Appl. No. 11/470,581, 7 pages.

* cited by examiner

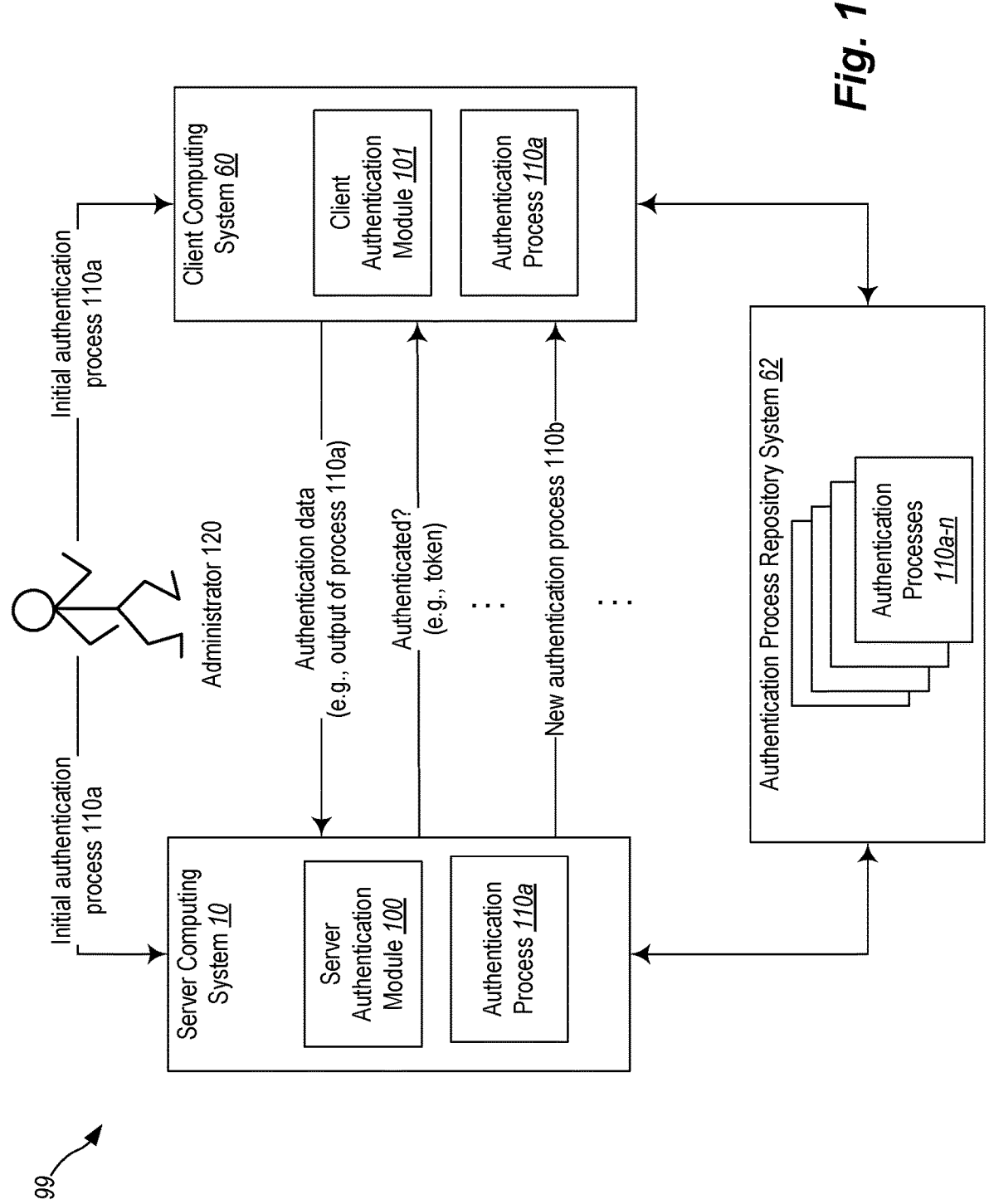

Fig. 2B

2B00: The process of 2A00, wherein the associating an indication of a first authentication process with a client computing system includes:

> 2B01: Storing the indicator of the first authentication process in a table in association with an identifier of the client computing system

Fig. 2C

2C00: The process of 2A00, wherein the applying the first authentication process to the first timestamp to generate a second number based on the timestamp includes:

> 2C01: Applying an operator to the timestamp and an integer

Fig. 2D

2D00: The process of 2A00, further comprising:

> 2D01: Transmitting to the client computing system an indicator of a second authentication process

> 2D02: In a subsequent authentication interaction with the second computing system, applying the second authentication process to a second timestamp that is later in time than the first timestamp

TIMESTAMP-BASED AUTHENTICATION

TECHNICAL FIELD

The present disclosure relates to methods, techniques, and systems for computer security, and more particularly to timestamp-based approaches to authentication that verify the identity of a computing device in addition to its user.

BACKGROUND

Hackers and other malicious parties are increasingly attempting to penetrate computing systems or networks operated by home users, corporations, or governments. In many cases, hackers gain access to systems or networks by using stolen credentials (e.g., user names and passwords) of a legitimate user. For example, a hacker can access lists of usernames and passwords that have been stolen from compromised systems. Since many users use the same password for many different services, the hacker can then try those passwords with other systems.

BRIEF DESCRIPTION OF THE DRAWINGS

FIG. 1 is a block diagram illustrating interacting authentication modules in a system according an example embodiment.

FIGS. 2A-2E are flow diagrams illustrating authentication processes provided by example embodiments.

DETAILED DESCRIPTION

Figure 2A:
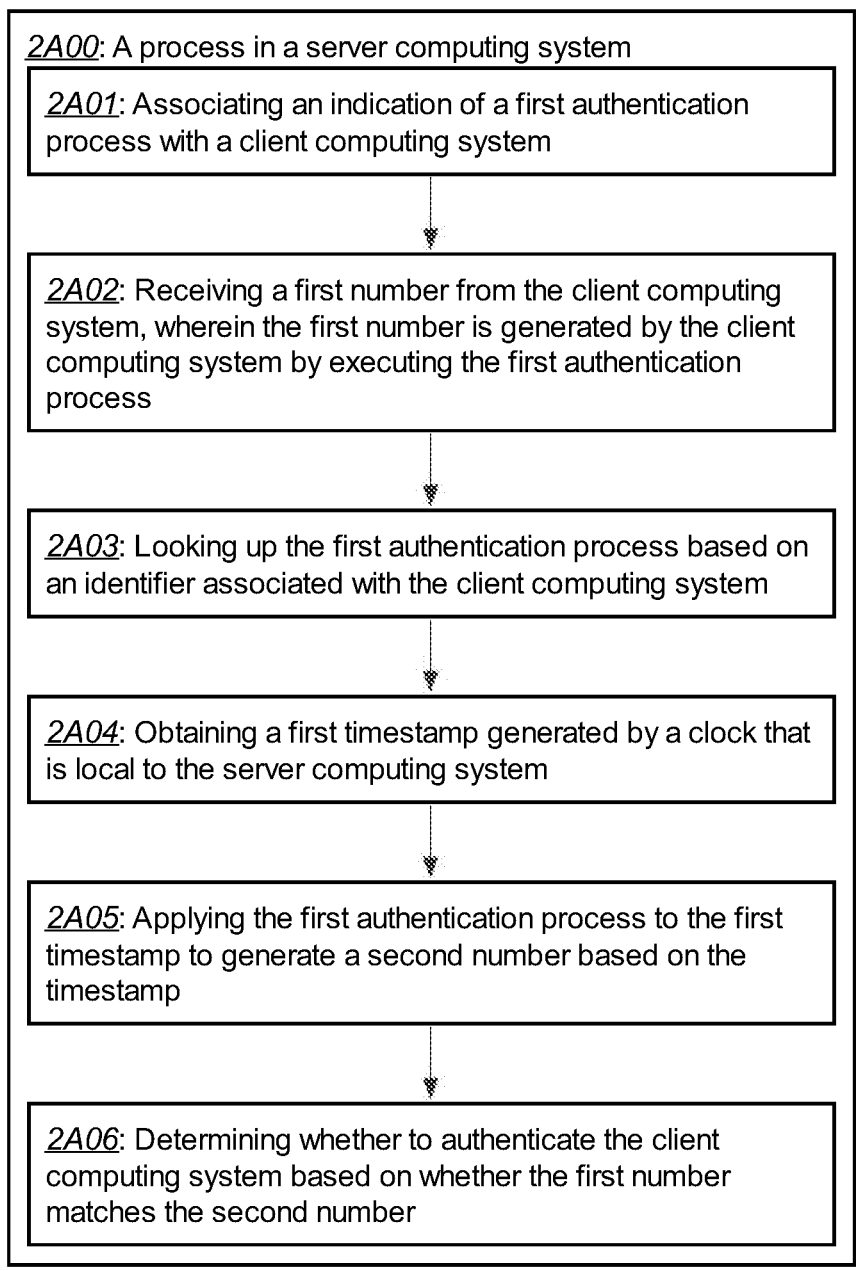

Embodiments described herein provide methods, devices, and systems for computer security, and more particularly timestamp-abased authentication techniques provide an added level of security for systems, services, and organizations. Typical embodiments provide an authentication method that utilizes an authentication process that is shared between a first and second computing system. The identity of the authentication process is a secret that is shared between the two computing systems. The process provides as output a number that is based on a timestamp. The first computing system executes the authentication process using a timestamp obtained from its clock. The resulting number is transmitted to the second computing system, possibly along with other authentication data, such as a username and/or password. In response, the second computing system executes the authentication process using a timestamp obtained from its clock. If the numbers generated by the first and second computing systems match, the first computing system is authenticated.

In typical embodiments, the first computing system is a client and the second computing system is a server. The client authenticates itself in order to access a service provided by the server. In other embodiments, the client may authenticate itself with the server in order to obtain an authentication token, which can be used to authenticate the client to some other system or service, possibly provided or managed by some third party.

The described techniques improve an existing technology, such as by improving the operation, integration, or efficiency of one or more computing systems. Specifically, the described techniques address shortcomings in current approaches to computer security. Using the described techniques makes it more difficult for a malicious computing system to intrude into a secure service, system, or network. The described techniques restrict access to only those computers or devices that have been configured with the proper authentication processes. The described techniques can be used to verify the identity of the user in addition to the device being used by the user. Thus, even if a malicious party steals a user's login credentials (e.g., username and password), the malicious party will still not be able to access a secure system unless the party has also stolen the user's device.

FIG. 1 is a block diagram illustrating interacting authentication modules in a system according an example embodiment. In FIG. 1, system 99 includes a server computing system 10, a client computing system 60, and an authentication process repository system 62. The server 10 includes a server authentication module 100 and an authentication process 110$a$. The client 60 includes a client authentication module 101 and the same authentication process 110$a$. The repository system 62 includes multiple authentication processes 110$a$-110$n$.

In some embodiments, the client 60 is a computer that is deployed for interaction with a secure service or network, such as may be provided by a corporation, university, or other organization. When the client 60 is initially configured (e.g., when it is unboxed and configured for its user), an administrator 120 or other privileged user stores an indication of an initial authentication process 110$a$ on the client 60 and the server 10. This may be done manually, such as by inputting an identifier of an authentication process. In other embodiments, the indication of the authentication process 110$a$ may be transmitted to the client and/or server over a secure channel. In response, the client 60 and server 10 each obtain and store the identified authentication process 110$a$ from the repository system 110$a$-$n$. The client 60 is then ready to use the authentication process 110$a$ during authentication interactions with the sever 10, as described below.

In typical embodiments, authentication processes take as input a timestamp and output a number based on the timestamp. An example process may be expressed as K=a*timestamp+b, where a and b are constants stored as part of the authentication process. In some embodiments, the constants a and b are fixed or static parts of the process, whereas in other implementations, the constants are configuration data that is specified when the process is selected or stored. Other embodiments may use other or additional operators (e.g., subtraction, exponentiation, modulo, etc.) to compute the output based on the timestamp.

The client 60 authenticates itself to the server 10 as follows. First, the client obtains a timestamp reflecting the current time from a hardware or software clock. The clock is typically local to the client 60 but may in some embodiments be a network-accessible time server. The client 60 then applies the authentication process 110 to the timestamp to obtain a number used as an authentication key. For example, if the timestamp is 1544512669, and if the process 110 applies the function K=34*timestamp+54543, the resulting value would be 52513485289. The determined number is then transmitted by the client 60 to the server 10 as authentication data. The authentication data may include other information, such as a username and password (or hash thereof). The authentication data may also or instead include device identifiers, such as MAC addresses, CPU identifiers, or the like.

When the server 10 receives the authentication data from the client 60, the server 10 computes an authentication number in the same way as the client 60. The server 10 first determines the correct authentication process to utilize, by looking up the process 110a in a table or database that associates clients with authentication processes. The server 10 will typically have a table that maps clients to their respective authentication processes, so that different processes can be employed for each client. In some embodiments, this table maps a non-modifiable device identifier of the client (e.g., MAC address, CPU identifier) to an identifier of the authentication process. The server 60 receives the device identifier as part of the authentication data, via a separate network transmission, or otherwise as part of an initial network handshake or other network protocol related operation.

The server 10 then obtains a timestamp from a clock and applies process 110 to the timestamp to obtain a number. This number is compared to the number received from the client 60. If the numbers (and password and other identifiers if present) match, the client 60 is authentic. The sever 10 then notifies the client 60 that it has been authenticated. In some embodiments, this notification includes a token that the client 60 can use with the server 10. This token may also or instead be used with another system or service in that requires authenticated access managed by the server 10. For example, the server 10 can provide an authentication service that is used by other (possibly third-party) systems or organizations.

The timestamps used by the server 10 and client 60 may not be the same, due to network transmission latencies, clock drift, or the like. To account for such variations, the authentication process 110 may reduce the precision of the time stamp to a larger time interval. For example, if the timestamp is expressed in seconds, the authentication process 110 may round, floor, or ceiling the timestamp to the nearest 10-second interval (e.g., by dropping the ones digit). Also, to account for client and server timestamps that transition across the boundaries of a time interval, the server 10 may apply the process 110 to timestamps reflecting the current as well as the previous time interval. As an example, suppose the timestamp obtained by the client is 1239, and that the authentication process drops the ones digit before applying its function. Using K=34*modified timestamp+42 yields 34*123+42=4224. If the timestamp obtained by the server 10 is one second later (1240), the server will generate K=34*124+42=4258, which does not match the number received from the client 60. But if the server 10 also checks the prior time interval (123), it will obtain a number (34*123+42=4224) that matches the number received from the client 60. In other embodiments, the client 60 may instead transmit two numbers, one based on the current time interval and a second based on the next future time interval. The server 10 then checks both of these against its number based on the current time, and authenticates the client 60 if either numbers match the server's number.

The authentication process may be modified or altered from time to time or upon the occurrence of an event. For example, the server 10 may instruct the client 60 to use a new authentication process after every n-th authentication, after a passage of time (e.g., 24 hours), at a fixed date (e.g., Jan. 1, 2020), or the like. By changing the authentication process it becomes more difficult for a malicious party to recover the number-generating function at the heart of the described techniques.

The repository system 62 stores and provides authentication processes for use by other devices and systems. The system 62 is in some embodiments a public repository. Because the described techniques in some embodiments rely on keeping the identity of the specific authentication method secret, the details of the different authentication processes may be public. In such embodiments, the system 62 will typically host many authentication processes, so that a malicious party cannot try them all by brute force. Also, or alternatively, each authentication process may utilize configurable constants or other inputs that can also be kept as secret between the client and server. In some embodiments, the authentication processes are themselves private. For maximum security, the authentication processes are only shared between machines and systems within an organization. For example, a corporation can establish a secret set of authentication processes that is used only for purposes of authenticating employee devices.

In some embodiments, the described techniques are employed to authenticate users and their devices in the context of a corporate or organizational network. In other contexts, the techniques can be employed in the context of an online Web-based service. In such embodiments, each time a user signs up for a Web service, the service provides an indication of an initial authentication process to use. The user's client device maintains a table that maps Web services to authentication processes, so that the correct authentication process can be employed based on the Web service the user is accessing. Further, as noted above, these techniques can be combined with others that use device identifiers (e.g., MAC or CPU identifiers) to verify the identity of devices when accessing secure systems. Such techniques are described in U.S. Patent Application Pub. No. 2018/0146001, entitled "Network Security based on Device Identifiers and Network Addresses," filed Nov. 22, 2016, which is incorporated herein by reference in its entirety.

Note that the described authentication techniques can be performed without user interaction. In particular, the authentication module can automatically and without user intervention apply the appropriate authentication process, transmit the resulting number (possibly along with other, cached login credentials or tokens) to the server, and so on. In this way, the techniques may be completely transparent to the user. Furthermore, the techniques may be implemented at different levels of the protocol stack in different embodiments. For example, one embodiment may perform the authentication interaction at the application layer, such as via an HTTP connection. Another embodiment may perform the authentication interaction at a lower layer, such as layer 2 (data link) or 3 (network).

FIGS. 2A-2E are flow diagrams illustrating authentication processes provided by example embodiments.

FIG. 2A is a flow diagram of example logic in a server computing system. The illustrated logic in this and the following flow diagrams may be performed by, for example, the server module 100 described with respect to FIG. 1, above. FIG. 2A illustrates a process 2A00 that includes the following block(s).

Block 2A01 includes associating an indication of a first authentication process with a client computing system, wherein the first authentication process takes as input a timestamp and generates as output a number that is based on the timestamp. Typically, the client computing system is assigned an authentication process during initial setup, such as when the client computing system is deployed within an organization that is using the described security mechanism. The authentication process is a function, code block, or similar logic that takes a timestamp (e.g., a 64-bit integer) as input, performs operations on that timestamp, and provides a numerical result as output.

Block 2A02 includes receiving a first number from the client computing system, wherein the first number is generated by the client computing system by executing the first authentication process. The server computing system receives the number as part of an authentication interaction with the client computing system, such as when the client computing system is attempting to access resources of or managed by the server computing system. For example, an employee who operates the client computing system is connecting and logging in to a corporate network that is managed by the server computing system. The number that is received is the output of the authentication process, applied by the client computing system to a timestamp obtained from its local clock.

Block 2A03 includes looking up the first authentication process based on an identifier associated with the client computing system. The server computing system then looks up the authentication process, such as by examining a table or other mapping that associates client computers with authentication processes. The table typically maps a client identifier, such as a non-modifiable hardware identifier (e.g., MAC address, CPU identifier) to an authentication process. In some embodiments, the authentication processes are public and can be identified by number of other identifier. In other embodiments, the set of authentication processes is kept secret by an organization.

Block 2A04 includes obtaining a first timestamp generated by a clock that is local to the server computing system. The server computing system next obtains a local timestamp, such as by making the appropriate system call to get a timestamp from the system clock.

Block 2A05 includes applying the first authentication process to the first timestamp to generate a second number based on the timestamp. The server computing system then applies the authentication process to the obtained timestamp, which results in the second number, which can in turn be compared to the first number provided by the client computing system.

Block 2A06 includes determining whether to authenticate the client computing system based on whether the first number matches the second number. The server will authenticate the client computing system only when the number provided by the client computing system matches the number generated locally by the server computing system. When these numbers match, the client and server are using the same authentication process with the same (or substantially the same) input data (timestamp) and any configuration parameters.

FIG. 2B is a flow diagram of example logic illustrating an extension of process 2A00 of FIG. 2A. FIG. 2B illustrates a process 2600 that includes the process 2A00, wherein the associating an indication of a first authentication process with a client computing system includes the following block(s).

Block 2601 includes storing the indicator of the first authentication process in a table in association with an identifier of the client computing system, wherein the first authentication process is assigned to the client computing system during initial setup, wherein the first authentication process is one of multiple public authentication processes that each generate as output a number that is based on a timestamp. In some embodiments, all authentication processes are public and can be identified by number of other identifier. After selecting and assigning an authentication process to the client computing system, the server computing system will remember this assignment by storing an identifier of the process in a table or similar data structure or repository (e.g., database). As noted above, a client hardware identifier may be used to identify the client computing system. In other cases, the authentication process is associated with a user identifier in addition to or instead of a client hardware identifier.

FIG. 2C is a flow diagram of example logic illustrating an extension of process 2A00 of FIG. 2A. FIG. 2C illustrates a process 2C00 that includes the process 2A00, wherein the applying the first authentication process to the first timestamp to generate a second number based on the timestamp includes the following block(s).

Block 2C01 includes applying an operator to the timestamp and an integer, wherein the operator and the integer are specified by the authentication process. Typical authentication processes will operate on the timestamp and at least one other integer using one or more operators. An example process may be expressed as k equals a*timestamp+b, where k is the output number, and where a and b are constants. The constants may be hard coded into the authentication process. In other embodiments, to provide a wider variety of processes, the constants a and b may be selected by the server computing system, such as by selecting two random numbers. These constants are provided to the client computing system and stored by the client and server along with an indication of the authentication process itself. Note that in some embodiments the authentication process may also reduce the precision of the timestamp, such as by rounding or flooring the time to a predetermined time interval (e.g., nearest second, nearest 10-second window, nearest minute). This technique can be used to account for clock drift, communication delays, and/or small differences between the client and server clocks.

FIG. 2D is a flow diagram of example logic illustrating an extension of process 2A00 of FIG. 2A. FIG. 2D illustrates a process 2D00 that includes the process 2A00, and which further includes the following block(s).

Block 2D01 includes transmitting to the client computing system an indicator of a second authentication process. In response to some event, the server computing system will select a new authentication process and instruct the client computing system to use that process in future interactions. Various events/conditions are contemplated, such as selecting a new authentication process on every login, every n-th login, after a passage of time (e.g., every day, week, etc.), at or after a specified date, or the like. By transmitting the indicator of the second authentication process to the client computing system, the server instructs the client to use the second authentication process in subsequent interactions and until a new one is selected at some later time. Some embodiments include client-specific rules for updating the authentication process, so that each client may have a customized or individualized update regimen.

Block 2D02 includes in a subsequent authentication interaction with the second computing system, applying the second authentication process to a second timestamp that is later in time than the first timestamp. The server computing system will use the new authentication process in future interactions with the client computing system.

Figure 2E:
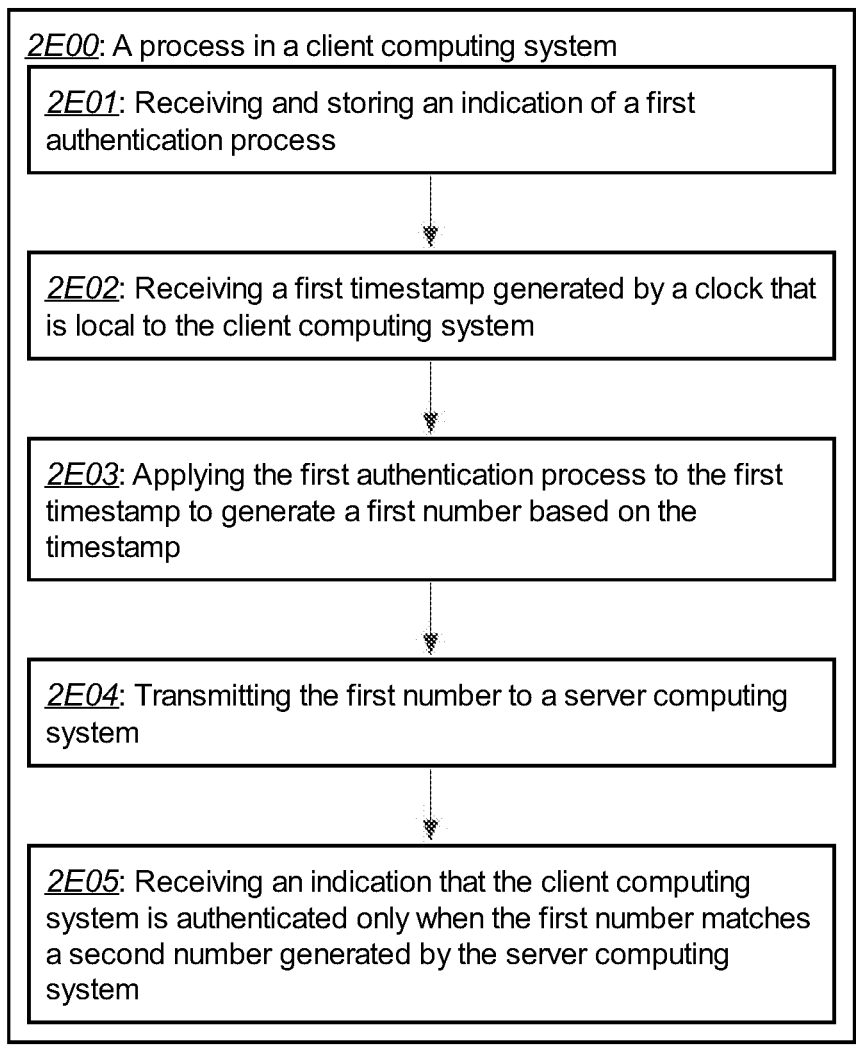

FIG. 2E is a flow diagram of example logic in a client computing system. The illustrated logic in this and the following flow diagrams may be performed by, for example, the client module 101 described with respect to FIG. 1, above. FIG. 2E illustrates a process 2E00 that includes the following block(s).

Block 2E01 includes during initial setup of the client, receiving and storing an indication of a first authentication process that takes as input a timestamp and generates as output a number that is based on the timestamp. In typical scenarios, the client is configured by a user with elevated privilege (e.g., administrator, root user). When the client is initially deployed, the administrator inputs an identifier of the authentication process for storage by the client. The administrator also records this identifier in a user database or other data store (e.g., active directory) so that it can be recalled during later authentication interactions.

Block 2E02 includes receiving a first timestamp generated by a clock that is local to the client computing system. The client obtains the timestamp by making the appropriate system or API call to access the current time from a local hardware or software clock. In some embodiments, a time server may be used instead.

Block 2E03 includes applying the first authentication process to the first timestamp to generate a first number based on the timestamp. The client computing system then applies the authentication process to the obtained timestamp, which results in a number.

Block 2E04 includes transmitting the first number to a server computing system. The number generated by the authentication process is transmitted to the server computing system, possibly along with other authentication information, such as a username and/or password (or a hash thereof). The transmission is typically encrypted so that a malicious party cannot intercept the authentication information.

Block 2E05 includes receiving an indication that the client computing system is authenticated only when the first number matches a second number generated by the server computing system, wherein the second number is generated by the server computing system by applying the first authentication process to a second timestamp generated by a clock that is local to the server computing system. When the transmitted number matches a number that is similarly generated by the server, the server will transmit an indication that the client is authenticated. For example, the server may transmit a token that can be used as an access key. Such tokens are commonly time-limited, meaning that after a certain amount of time (or number of uses) passes, the client will be challenged by the server to re-authenticate itself.

Figure 3:
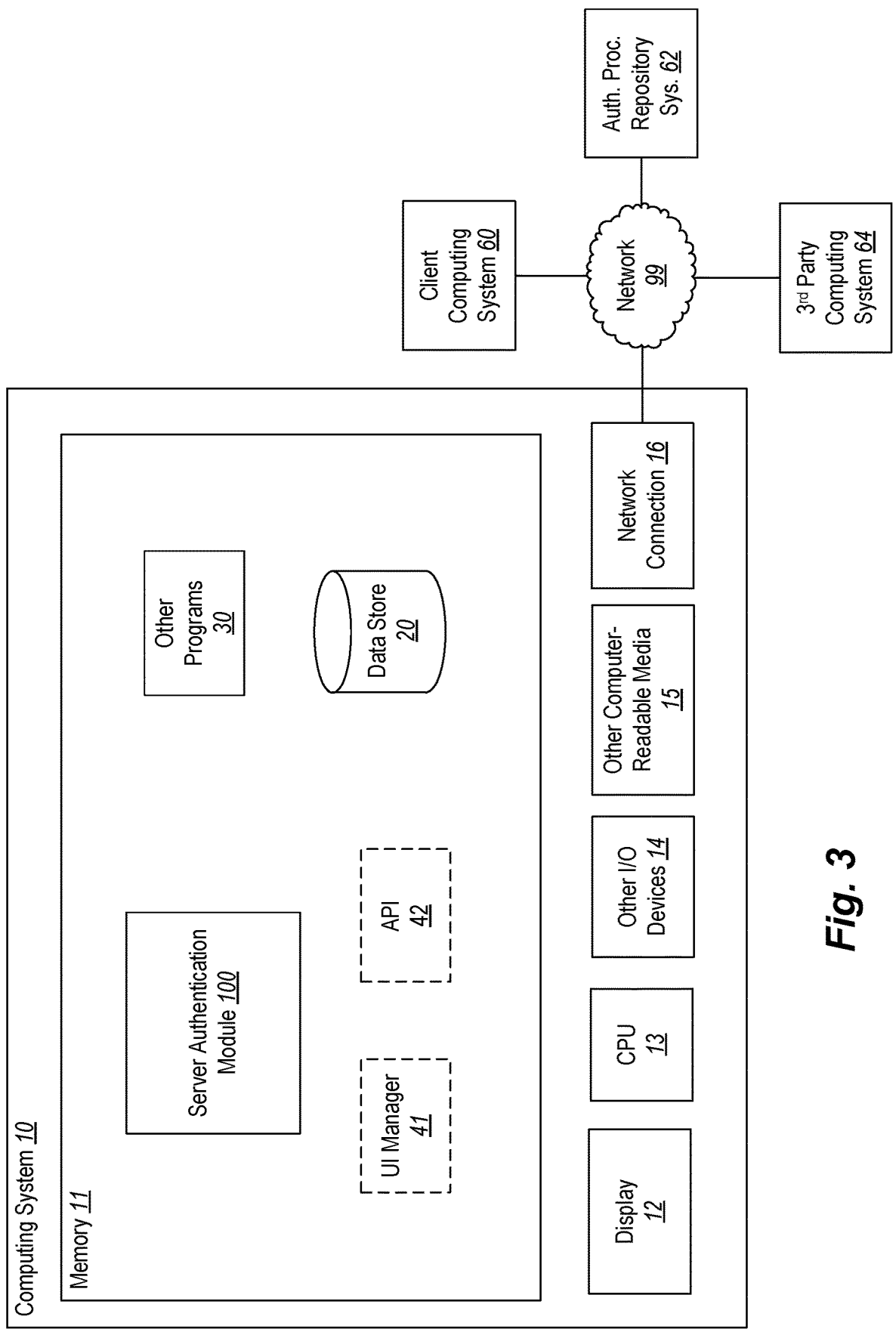
FIG. 3 is a block diagram of a computing system for implementing an authentication module according to an example embodiment.

FIG. 3 is a block diagram of a computing system for implementing an authentication module according to an example embodiment. In particular, FIG. 3 shows a computing system 10 that executes the server authentication module 100 described above. Similar techniques can be applied to implementing the client authentication module 101 described above.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The module 100 is shown residing in memory 11. In other embodiments, some portion of the contents, some or all of the components of the module 100 may be stored on and/or transmitted over the other computer-readable media 15. The module 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 3 may not be present in any specific implementation. For example, some embodiments may not provide other computer readable media 15 or a display 12.

The module 100 is shown executing in the memory 11 of the device 100. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the module 100.

The UI manager 41 provides a view and a controller that facilitate user interaction with the module 100 and its various components. For example, the UI manager 41 may provide interactive access to the module 100, such that users or administrators can interact with the module 100. In some embodiments, access to the functionality of the UI manager 41 may be provided via a Web server, possibly executing as one of the other programs 30. In such embodiments, a user operating a Web browser executing on a client system or device can interact with the module 100 via the UI manager 41.

The API 42 provides programmatic access to one or more functions of the module 100. For example, the API 42 may provide a programmatic interface to one or more functions of the module 100 that may be invoked by one of the other programs 30 or some other module. In this manner, the API 42 facilitates the development of third-party software, such as user interfaces, plug-ins, adapters (e.g., for integrating functions of the module 100 into Web applications), and the like.

The module 100 may interact using network connection 16 via a network 99 with other devices/systems including computing systems 60, 62, and 64. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. Computing systems 60, 62, and 64 may be constituted similarly to system 10. In some embodiments, client system 60 authenticates itself to system 10, which in response provides an authentication token that can be used with the third-party computing system 64.

Note that one or more general purpose or special purpose computing systems/devices may be used to implement and/or execute the module 100. However, just because it is possible to implement the module 100 on a general purpose computing system does not mean that the techniques themselves or the operations (taken alone or in combination) required to implement the techniques are conventional or well known. The techniques are not conventional at least because they address and improve an existing technology, such as by improving the operation, integration, or efficiency of one or more computing systems.

In an example embodiment, components/modules of the module 100 are implemented using software programming techniques. For example, the module 100 may be implemented as a "native" executable running on the CPU 13, along with one or more static or dynamic libraries. In other embodiments, the module 100 may be implemented as instructions processed by a virtual machine that executes as one of the other programs 30.

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the module 100, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Furthermore, in some embodiments, some or all of the components of the module 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A system, the system comprising:
a server computing system;
a client computing system that is configured to:
during initial setup of the client computing system, store an indication of a first authentication process that takes as input a timestamp and generates as output a number that is based on the timestamp;
receive a first timestamp generated by a clock that is local to the client computing system;
reduce precision of the first timestamp;
apply the first authentication process to the reduced precision first timestamp to generate a first number based on the timestamp; and
transmit the first number to the server computing system; and
wherein the server computing system is configured to:
receive the first number from the client computing system;
receive a second timestamp generated by a clock that is local to the server computing system;
reduce precision of the second timestamp;
apply the first authentication process to the reduced precision second timestamp to generate a second number based on the timestamp;
determine a reduced precision third timestamp that is immediately prior to the reduced precision second timestamp;
apply the first authentication process to the reduced precision third timestamp to generate a third number based on the timestamp;
authenticate the client computing system only when the first number matches the second number or when the first number matches the third number; and
in response to an event, transmit an indication of a new authentication process to the client computing system, wherein the new authentication process replaces a previous authentication process and is to be used in subsequent authentication interactions between the server computing system and client computing system.

2. The system of claim 1, wherein the server computing system is configured to: deny access to the client computing system when the first number does not match the second number.

3. The system of claim 1, wherein the server computing system is configured to:
receive a hashed password from the client computing system; and
authenticate the client computing system only when the hashed password matches a previously stored hashed password stored by the server computing system.

4. The system of claim 1, wherein the server computing system is configured to: in response to authentication of the client computing system, transmit an indication of a second authentication process to the client computing system, for use in subsequent authentication interactions.

5. The system of claim 1, wherein the server computing system is configured to: drop at least one digit of precision from the second timestamp in order to account for differences between the clock of the client computing system and the clock of the server computing system.

6. The system of claim 1, wherein the event includes at least one of:
the client computing system has been using the previous authentication process for at least a predetermined amount of time;
the client computing system has been authenticated at least a predetermined number of times; and
a predetermined date or time has passed.

7. The system of claim 1, wherein the first authentication process is one of multiple publicly accessible authentication processes, wherein the client computing system and server computing system each store a table of the multiple processes, and wherein the indication of the first authentication process is an index into the table.

8. The system of claim 1, wherein the first authentication process specifies an operator and an integer, wherein the first authentication process applies the operator to the timestamp and the integer.

9. The system of claim 1, wherein the first authentication process is configured to:
  multiply the timestamp by a first integer to obtain a product value; and
  add a second integer to the product value to obtain a sum.

10. A method in a server computing system, the method comprising:
  associating an indication of a first authentication process with a client computing system, wherein the first authentication process takes as input a timestamp and generates as output a number that is based on the timestamp;
  receiving a first number from the client computing system, wherein the first number is generated by the client computing system by applying the first authentication process to a first timestamp obtained by reducing precision of a timestamp generated by a clock that is local to the client computing system;
  looking up the first authentication process based on an identifier associated with the client computing system;
  obtaining a second timestamp generated by a clock that is local to the server computing system;
  reducing precision of the second timestamp;
  applying the first authentication process to the reduced precision second timestamp to generate a second number based on the timestamp;
  determining a reduced precision third timestamp that is immediately prior to the reduced precision second timestamp;
  applying the first authentication process to the reduced precision third timestamp to generate a third number based on the timestamp;
  determining whether to authenticate the client computing system based on whether the first number matches the second number or whether the first number matches the third number; and
  in response to an event, transmitting an indication of a new authentication process to the client computing system, wherein the new authentication process replaces a previous authentication process and is to be used in subsequent authentication interactions between the server computing system and client computing system.

11. The method of claim 10, further comprising: authenticating the client computing system when the first number matches the second number.

12. The method of claim 10, further comprising: denying access by the client computing system when the first number does not match the second number.

13. The method of claim 10, wherein the associating an indication of a first authentication process with a client computing system includes: storing the indication of the first authentication process in a table in association with an identifier of the client computing system, wherein the first authentication process is assigned to the client computing system during initial setup, wherein the first authentication process is one of multiple public authentication processes that each generate as output a number that is based on a timestamp.

14. The method of claim 10, wherein the applying the first authentication process to the first timestamp to generate a second number based on the timestamp includes: applying an operator to the timestamp and an integer, wherein the operator and the integer are specified by the authentication process.

15. The method of claim 10, further comprising:
  transmitting to the client computing system an indicator of a second authentication process; and
  in a subsequent authentication interaction with the second computing system, applying the second authentication process to a third timestamp that is later in time than the second timestamp.

16. The method of claim 15, wherein the transmitting to the client computing system an indicator of a second authentication process includes: transmitting the indicator of the second authentication process in response to authenticating the client computing system, thereby causing the client computing system to use the second authentication process in the subsequent authentication interaction.

17. The method of claim 10, further comprising: in response to an event, transmitting an indication of a new authentication process to the client computing system, wherein the new authentication process replaces a previous authentication process and is to be used in subsequent authentication interactions between the server computing system and client computing system, wherein the event is a number of authentication interactions between the client computing system and server computing system.

18. A method in a client computing system, the method comprising:
  during initial setup of the client, receiving and storing an indication of a first authentication process that takes as input a timestamp and generates as output a number that is based on the timestamp;
  receiving a first timestamp generated by a clock that is local to the client computing system;
  reducing precision of the first timestamp;
  applying the first authentication process to the reduced precision first timestamp to generate a first number based on the timestamp;
  transmitting the first number to a server computing system;
  receiving an indication that the client computing system is authenticated only when the first number matches a second number generated by the server computing system or when the first number matches a third number, wherein the second number is generated by the server computing system by applying the first authentication process to a second reduced precision timestamp obtained by reducing precision of a timestamp generated by a clock that is local to the server computing system, wherein the third number is generated by the server computing system by applying the first authentication process to a third reduced precision timestamp that is immediately prior to the reduced precision second timestamp; and
  receiving an indication of a new authentication process, wherein the indication is transmitted by the server computing system in response to an event, wherein the new authentication process replaces a previous authentication process and is to be used in subsequent authentication interactions between the server computing system and client computing system.

19. The method of claim 18, further comprising:
  transmitting a username and password to the server computing system; and receiving the indication that the client computing system is authenticated only when the password matches a password stored by the server computing system.

* * * * *